United States Patent
Stoev et al.

(10) Patent No.: US 11,748,786 B2
(45) Date of Patent: Sep. 5, 2023

(54) METHOD AND APPARATUS FOR SERVING A DIGITAL ADVERTISEMENT HAVING AN ADVERTISEMENT IDENTIFIER

(71) Applicant: AdHash AG, Zug (CH)

(72) Inventors: Martin Stoev, Zug (CH); Damyan Stanchev, Zug (CH)

(73) Assignee: Ad Hash AG, Zug (CH)

( * ) Notice: Subject to any disclaimer, the term of this patent is extended or adjusted under 35 U.S.C. 154(b) by 0 days.

(21) Appl. No.: 17/528,839

(22) Filed: Nov. 17, 2021

(65) Prior Publication Data
US 2022/0156800 A1    May 19, 2022

Related U.S. Application Data

(60) Provisional application No. 63/115,500, filed on Nov. 18, 2020.

(51) Int. Cl.
*G06Q 30/00*    (2023.01)
*G06Q 30/0241*  (2023.01)

(52) U.S. Cl.
CPC ............... *G06Q 30/0276* (2013.01)

(58) Field of Classification Search
CPC .................................................. G06Q 30/0276
See application file for complete search history.

(56) References Cited

U.S. PATENT DOCUMENTS

| | | | |
|---|---|---|---|
| 8,335,721 B2* | 12/2012 | Samdadiya | G06Q 30/02 705/14.73 |
| 8,589,227 B1* | 11/2013 | Bridge | G06Q 30/0246 705/14.41 |
| 2003/0149634 A1* | 8/2003 | Hyun | G06Q 30/0625 705/26.62 |
| 2008/0059288 A1* | 3/2008 | Kokernak | G06Q 30/0201 705/7.29 |
| 2008/0154784 A1* | 6/2008 | Veeraraghavan | G06Q 30/0255 705/14.51 |
| 2009/0094114 A1* | 4/2009 | Rice | G06Q 40/04 705/37 |
| 2009/0216642 A1* | 8/2009 | Ho | G06Q 30/0224 705/14.25 |
| 2010/0030597 A1* | 2/2010 | Lewis, Jr. | G06Q 30/0251 705/14.49 |

(Continued)

OTHER PUBLICATIONS

Conditions for Acceptance of Adverts, Jul. 8, 2008, South Wales Evening Post (Year: 2008).*

*Primary Examiner* — Matthew L Hamilton
(74) *Attorney, Agent, or Firm* — Duquette Law Group (57) ABSTRACT

Embodiments of the innovation relate to, in an identification server device, a method of creating an advertisement identifier for a digital advertisement. The method comprises receiving an image file of the digital advertisement from an advertiser server device; converting the image file of the digital advertisement to a textual file; executing a hashing algorithm on the textual file to generate the advertisement identifier associated with the digital advertisement, the advertisement identifier being unique to the image file of the digital advertisement; transmitting the advertisement identifier to the advertiser server device for association with the digital advertisement; and storing the advertisement identifier on a publicly-accessible advertisement identifier database.

20 Claims, 8 Drawing Sheets

(56) References Cited

U.S. PATENT DOCUMENTS

| | | | |
|---|---|---|---|
| 2013/0103726 A1* | 4/2013 | Tjin | G06F 16/29 |
| | | | 707/827 |
| 2015/0095643 A1* | 4/2015 | Adams | G06F 21/6218 |
| | | | 713/165 |
| 2015/0220990 A1* | 8/2015 | Kobyakov | G06Q 30/0241 |
| | | | 705/14.6 |
| 2020/0374599 A1* | 11/2020 | Lykes | H04N 21/2541 |

* cited by examiner

METHOD AND APPARATUS FOR SERVING A DIGITAL ADVERTISEMENT HAVING AN ADVERTISEMENT IDENTIFIER

RELATED APPLICATIONS

This patent application claims the benefit of U.S. Provisional Application No. 63/115,500, filed on Nov. 18, 2020, entitled, "UNIQUE AD IDENTIFIERS AND DIRECT AD SERVING," the contents and teachings of which are hereby incorporated by reference in their entirety.

BACKGROUND

Digital advertising on the internet arose as a business model to fund the free distribution of content. Digital advertising has enabled publishers to grant users free access to digital materials while monetizing the user's attention through a combination of direct advertising sales and third-party advertising networks and exchanges.

Figure 1:
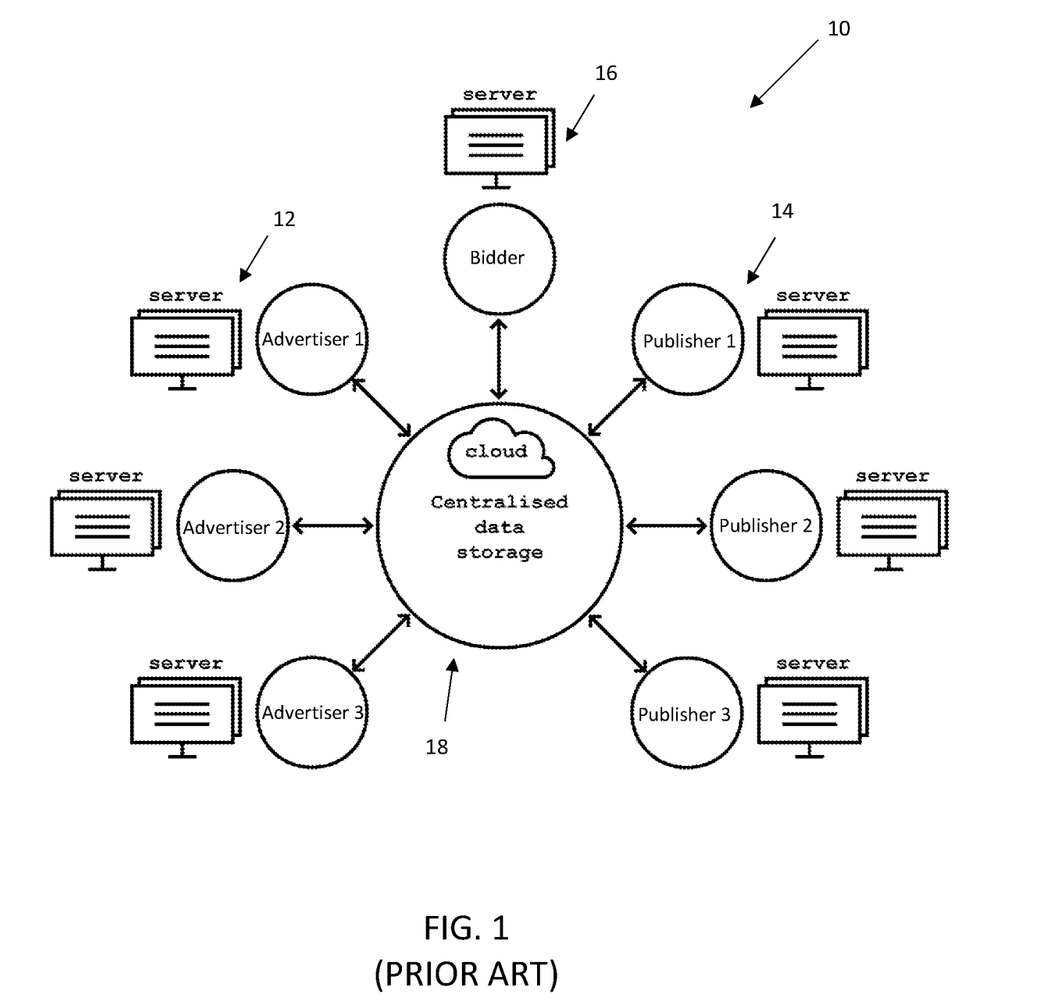
FIG. 1 illustrates a prior art digital advertisement distribution system.

A conventional digital advertising infrastructure utilizes centralized servers which are configured to store data and advertiser input, such as an image file (also referred to as an ad creative). For example, as shown in FIG. 1, a conventional infrastructure includes advertiser computer servers 12, publisher computer servers 14, and a bidder computer server 16 disposed in electrical communication with a central server 16. The central server 16 is responsible for communicating with the advertiser 12, publisher 14, and bidder computer servers 16, collecting data relating to digital advertisement, such as the number of impressions a given digital advertisement has received, and providing reports to advertisers.

SUMMARY

Conventional digital advertising and infrastructures suffer from a variety of deficiencies. For example, as the digital advertising industry has grown, so has its complexity. An increase in the complexity the advertising supply chain, has provided bad actors with increasing opportunities in defrauding good actors, as well as the number of parties interested, and to hide behind millions of advertising requests which occur every second.

In addition, the proliferation of advertising technology has given rise to what is commonly referred to as the surveillance economy of the internet. Namely, thousands of different companies are typically running scripts, injecting cookies, and/or fingerprinting web visitors and end users in order to track the steps the end users make. Thus, the complexity of the advertising supply chain not only has led to diminishing returns for advertisers and publishers in an environment in which the intermediaries are collecting an ever-increasing "tax" for providing their services, but has also caused internet users to actively move away from the surveillance economy, making the business model of free content distribution ever more challenging.

Further, as provided above, conventional digital advertising infrastructures utilize centralized servers that are configured to provide reports to advertisers. While these reports typically identify data relevant to an advertisement, such as advertisement revenue, the reports can include inaccuracies and discrepancies between the number of impressions a digital advertisement receives and its revenue. Accordingly, while advertisers are supposed to blindly trust all data provided by these centralized servers, they often times do not. Instead, advertisers can utilize ad tech middlemen to collect and provide their own data relating to an advertisement campaign. For example, there exists specific categories of ad tech middlemen tasked specifically with verifying advertisement data and preventing advertisement fraud. However, the collection of multiple advertisement datasets from different parties for a single advertisement campaign can provide datasets with relatively large discrepancies. As such, the truth about the performance of any advertisement campaign can rarely be fully determined, if at all.

By contrast to conventional digital advertising and infrastructure, embodiments of the present innovation relate to a method and apparatus for serving a digital advertisement having an advertisement identifier. In one arrangement, a digital advertisement distribution system includes an identification server device which is configured to create a unique advertisement identifier for each digital advertisement received and to store the advertisement identifier on a publicly-accessible database for all participants in the digital advertising infrastructure (e.g., for users, publishers, and advertisers). By storing the unique advertisement identifiers in an publicly-accessible database, such as part of an immutable ledger, which is accessible to devices that can access the digital advertisement distribution system, the identification server device can secure the digital advertising serving process. This allows publisher server devices and advertiser server devices of the digital advertisement distribution system to form part of a distributed architecture and to be configured as nodes of an edge-computing paradigm.

By distributing the digital advertising serving process among publisher server devices and advertiser server devices, advertisers and publishers can each be responsible for their own advertising needs. Each advertiser server device and publisher server device can operate their own secure database of transactional records and records related to advertising activities. This not only provides privacy and security, but also gives those entities full control over what data they store and for how long, making compliance with privacy regulations much easier to enforce.

For example, advertiser server devices can provide digital advertisements directly to publisher server devices for display and can serve the digital advertisements to user devices directly when the user devices visit advertiser server devices' websites or applications. This mitigates the boundary between the data sets of user devices who have seen digital advertisements as provided by a publisher server device and user devices who have visited the advertiser server device as a result of an impression or click on the advertisement. As such, advertisers can have the final say as to the impressions or clicks they should be paying for and the impressions or clicks that do not match their targeting criteria and should not be invoiced.

Publishers, on the other hand, can have immediate visibility into the impressions or clicks were not paid for and why. Accordingly, the publishers can make decisions in real-time whether to continue working with a given advertiser or not, based on the match rate achieved between their records.

Further, the distributed architecture of the digital advertisement distribution system provides a relatively more direct and less complex supply chain for digital advertising compared to conventional digital advertising infrastructures. As such, advertisers and publishers can forego having to rely on third parties for targeting, analyzing, or reporting on a given advertising campaigns. For example, the distributed architecture of the digital advertisement distribution system creates a completely trustless targeting environment in which advertisers are not required to trust any second or third party to serve their campaigns to the right audience. As such, the digital advertisement distribution system can provide an improvement in digital advertisement serving speed, can mitigate the necessity for third-party cookies and tracking, can reduce the commissions charged by the advertisement supply chain, and can enable accountability in both targeting and payment reconciliation, for example.

In one arrangement, the digital advertisement distribution system can include a bidder server device disposed in electrical communication with the advertiser server device and the publisher server device. The bidder server device can be configured as a platform that collects advertising bidding information provided by advertisers and advertisement slot availability information provided by publishers and performs auctions for the available advertisement slot inventory. The bidder server device, while being an intermediary device which matches supply and demand, is not configured to retain unique data that is not directly communicated between publisher server devices and advertiser server devices. Instead, the data relationship between publisher server devices and advertiser server devices is a first-party relationship.

Embodiments of the innovation relate to, in an identification server device, a method of creating an advertisement identifier for a digital advertisement. The method comprises receiving an image file of the digital advertisement from an advertiser server device; converting the image file of the digital advertisement to a textual file; executing a hashing algorithm on the textual file to generate the advertisement identifier associated with the digital advertisement, the advertisement identifier being unique to the image file of the digital advertisement; transmitting the advertisement identifier to the advertiser server device for association with the digital advertisement; and storing the advertisement identifier on a publicly-accessible advertisement identifier database.

Embodiments of the innovation relate to, in a publisher server device, a method for serving a digital advertisement. The method comprises, receiving a digital advertisement from an advertiser server device for display to a user device, each of the publisher server device and advertiser server device configured as a node of an edge-computing paradigm; comparing an advertisement identifier associated with the digital advertisement with a publicly-accessible advertisement identifier database; and when the advertisement identifier associated with the digital advertisement matches an advertisement identifier stored on the publicly-accessible advertisement identifier database, displaying the digital advertisement to the user device.

Embodiments of the innovation relate to, in an advertiser server device, a method for serving a digital advertisement. The method comprises transmitting an image file of the digital advertisement to an identification server device; receiving an advertisement identifier associated with the digital advertisement from the identification server device, the advertisement identifier being unique to the image file of the digital advertisement; and transmitting the digital advertisement including the image file and the advertisement identifier to a publisher server device for display to a user device, each of the advertiser server device and the publisher server device configured as a node of an edge-computing paradigm.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a method and apparatus for serving a digital advertisement having an advertisement identifier. In one arrangement, a digital advertisement distribution system includes an identification server device which is configured to create a unique advertisement identifier for each digital advertisement received and to store the advertisement identifier on a publicly-accessible database for all participants in the digital advertising infrastructure (e.g., for users, publishers, and advertisers). By storing the unique advertisement identifiers in publicly-accessible database, which is accessible to devices that can access the digital advertisement distribution system, the identification server device can secure the digital advertising serving process. This allows publisher server devices and advertiser server devices to form part of a distributed architecture and to be configured as nodes of an edge-computing paradigm. By distributing the digital advertising serving process among publisher server devices and advertiser server devices, advertisers and publishers can each be responsible for their own advertising needs. For example, each advertiser server device and publisher server device can operate their own secure database of transactional records and records related to advertising activities. This not only provides privacy and security, but also gives those entities full control over what data they store and for how long, making compliance with privacy regulations easier to enforce.

Figure 2:
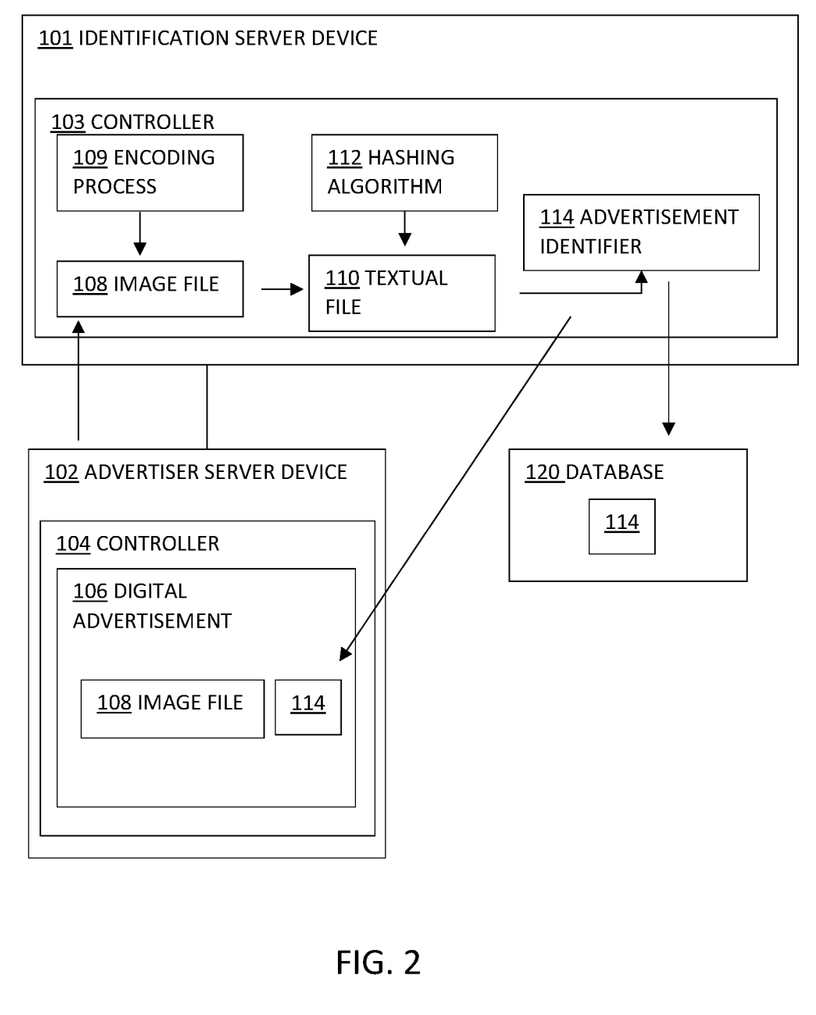
FIG. 2 a schematic representation of an identification server device of a digital advertisement distribution system, according to one arrangement.

FIG. 2 illustrates a schematic representation of an identification server device 101 of a digital advertisement distribution system 100, according to one arrangement. The identification server device 101 includes a controller 103, such as a memory and a processor, and is disposed in electrical communication with one or more advertiser server devices 102, such as via a network. The network can be configured as either a wired or wireless wide-area network (WAN) or local-area network (LAN). The controller 103 of the identification server device 101 is configured to create a unique advertisement identifier for each digital advertisement received from the advertiser server devices 102.

For example, prior to releasing a digital advertisement 106 onto the digital advertisement distribution system 100, an advertiser server device 102 transmits an image file 108 of the digital advertisement 106 to the identification server device 101. While the image file 108 can be configured in a variety of ways, in one arrangement, the image file 108 is an object or ad creative which includes the data utilized by the advertiser server device 102 to visually render the digital advertisement 106. In one arrangement, the advertiser server device 102 can provide bulk-uploads to the identification server device 101 in which multiple image files 108 are provided to the identification server device 101 in a single transaction.

When the identification server device 101 receives the image file 108 of the digital advertisement 106, the identification server device 101 is configured to convert the image file 108 to a textual file 110. For example, during the conversion process, the identification server device 101 can be configured to apply a binary-to-text encoding process 109 to encode the data of the image file 108 into the textual file 110. The identification server device 101 can utilize any of a number of binary-to-text encoding processes 109 for such encoding. For example, the identification server device 101 can utilize Base64, Ascii85, or Bech32 encode the data of the image file 108 into the textual file 110.

Next, the identification server device 101 is configured to execute a hashing algorithm 112 on the textual file 110 to generate the advertisement identifier 114 associated with the digital advertisement 106. The identification server device 101 can utilize any of a number of hashing algorithms to generate the advertisement identifier 114. For example, the identification server device 101 can utilize the SHA-1, SHA-2, SHA-256, MD5, NTLM, or RSA hashing algorithms, among others. The resulting advertisement identifier 114 is relatively short but unique to the corresponding image file 108 of the digital advertisement 106. Further, it is noted that while the identification server device 101 is configured to execute the hashing algorithm 112 on the textual file 110 additional information can be added to the textual file 110 before the hashing occurs. For example, the advertiser server device 102 can provide additional information, such as advertiser information, campaign information, or any other information, to the identification server device 101 prior to execution of the hashing algorithm 112. In such a case, identification server device 101 can execute the hashing algorithm 112 on the textual file 110 and the additional information to generate the advertisement identifier 114.

Following the hashing procedure, the identification server device 101 is configured to transmit the advertisement identifier 114 to the advertiser server device 102 for association with the digital advertisement 106. For example, the advertiser server device 102 can incorporate the advertisement identifier 114 as part of the digital advertisement 106 prior to distributing the digital advertisement 106 on the digital advertisement distribution system 100. Further, the identification server device 101 is configured to store the advertisement identifier 114 on a publicly-accessible database 120 to allow for free access to the advertisement identifier 114. While the publicly-accessible database 120 can be configured in a variety of ways, in one example, the database 120 is configured as a distributed ledger, such as blockchain, which is shared across a number of computerized devices. With configuration of the database 120 as a distributed ledger, the database 120 provides a level of immutability to the advertisement identifiers 114 stored therein.

By generating a singular, unique advertisement identifier 114 for every image file 108 received, the identification server device 101 attributes each image file 108 to a specific advertiser, as associated with a particular advertiser server device 102. Further, the utilization of a publicly-accessible database 120 provides internet users with transparency as to which advertiser is showing which advertisements. Additionally, the unique advertisement identifier 114 can also be used by user devices to store a list of all digital advertisement 106 that a particular user device has experienced over a certain period of time. This allows frequency and recency capping of the digital advertisements 106 to be enforced without tracking user devices and, therefore, jeopardizing their privacy.

Figure 3:
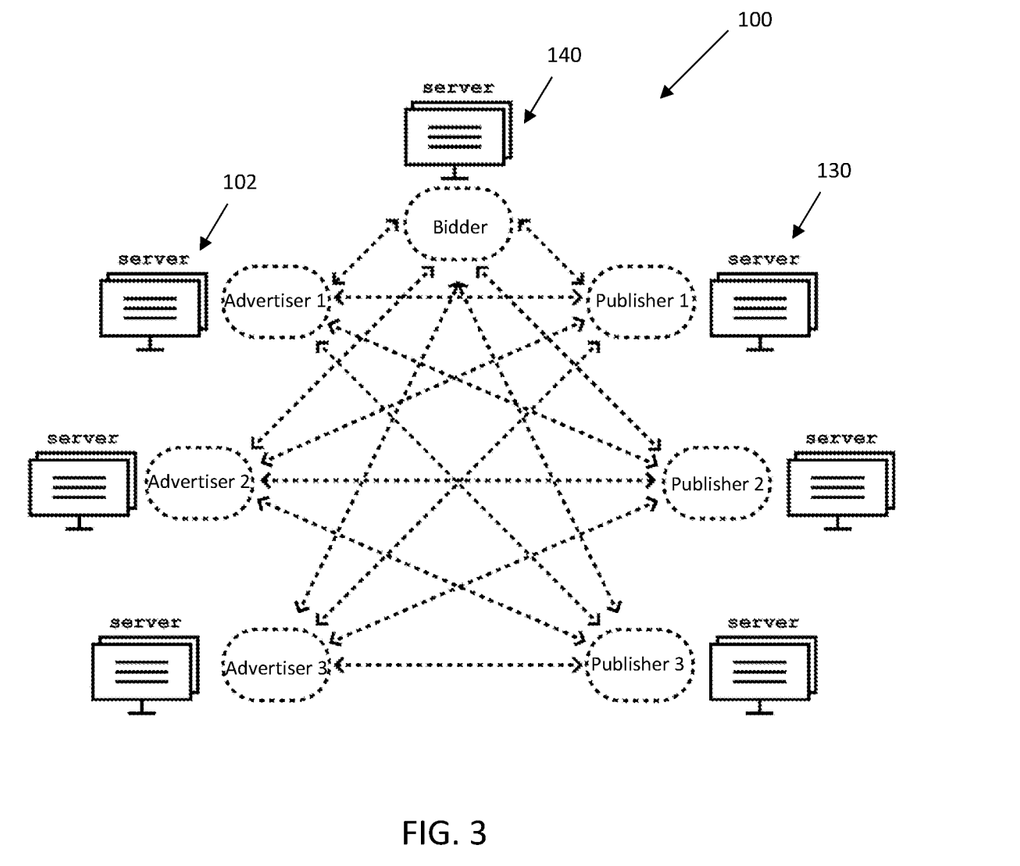
FIG. 3 illustrates a digital advertisement distribution system having a distributed architecture, according to one arrangement.

Additionally, with the identification server device 101 being configured to generate a unique advertisement identifier 114 for each digital advertisement 106 provided by the advertiser server devices 102 of the digital advertisement distribution system 100, each computerized device of the digital advertisement distribution system 100 can be configured as a node of an edge-computing paradigm. For example, with reference to FIG. 3, the digital advertisement distribution system 100 is configured as a distributed, direct advertisement-serving architecture having advertiser server devices 102 and publisher server devices 130 operating as independent nodes on the system 100. The digital advertisement distribution system 100 can also include a bidder server device 140. By enabling this edge-computing paradigm in a digital advertisement distribution system 100, the issues of data discrepancies plaguing the advertisement industry can be mitigated and a more direct and transparent relationship between advertisers and publishers can be provided. As such, each advertiser server device 102 and publisher server device 130 of the system 100 can privately and securely store its own data and can validate all transactions first-hand, rather than relying on third parties as is found in conventional centralized architectures.

Figure 4:
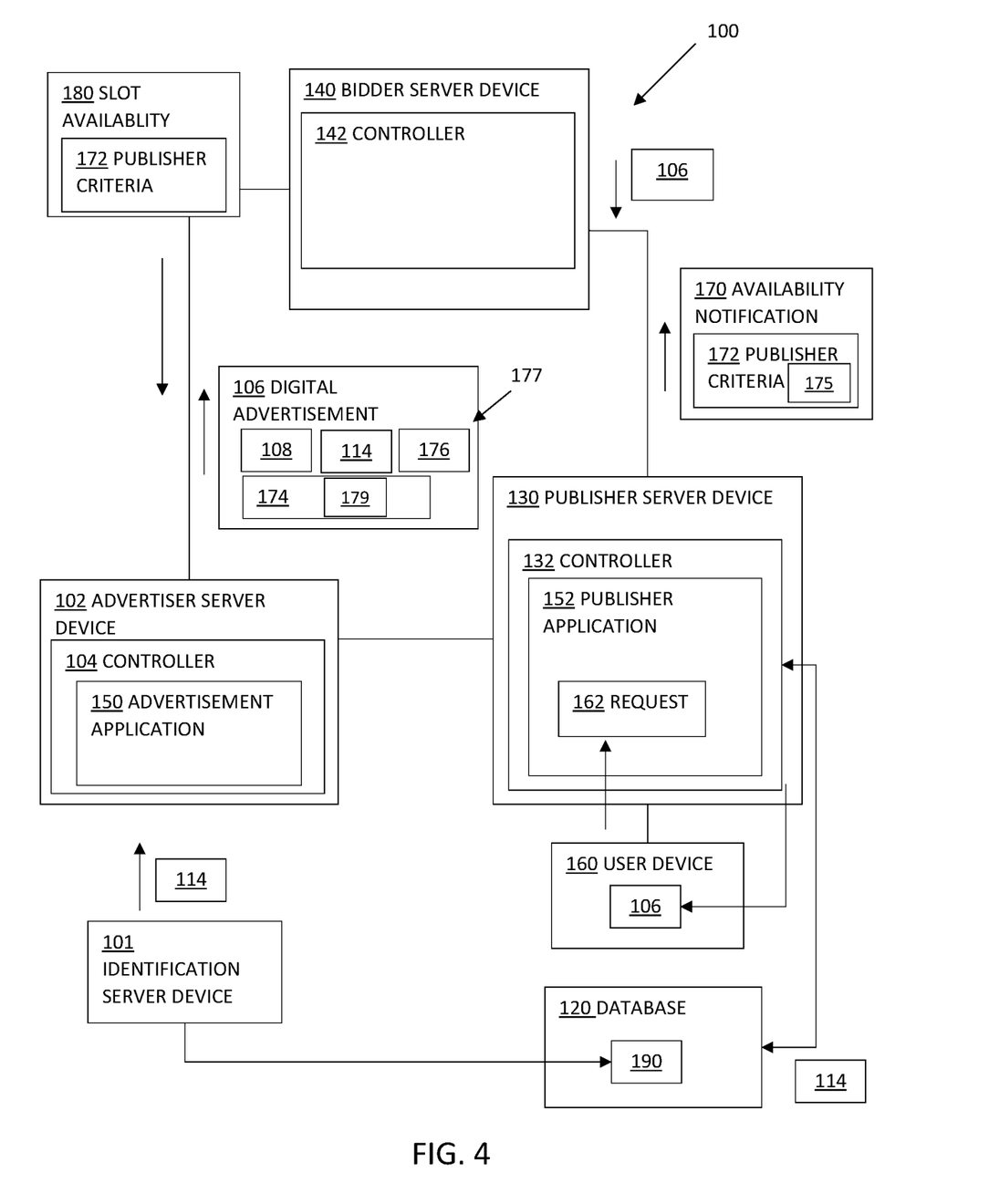
FIG. 4 illustrates a schematic representation of the digital advertisement distribution system of FIG. 3, according to one arrangement.

As provided above, because the identification server device 101 generates unique advertisement identifiers 114 for digital advertisements 106 and makes these identifiers 114 publicly known and available, the advertiser server devices 102 and publisher server devices 130 can be utilized as part of an edge-computing paradigm within the digital advertisement distribution system 100. FIG. 4 illustrates an arrangement of the digital advertisement distribution system 100 having an advertiser server device 102, a publisher server device 130, and a bidder server device 140.

As shown in FIG. 4, each of the advertiser server device 102 and publisher server device 130 are computerized devices, each having a controller 104, 132, respectively, such as a memory and a processor. The publisher server device 132 is configured to display digital advertisements to a user device 160 as part of a response to a uniform resource locator (URL) request 162 while the advertisement server device 102 is configured to source the digital advertisements to the user device. For example, the controller 104 of the advertiser server device 102 can include an advertisement application 150 and the controller of the publisher server device 130 can include a publisher application 152. Execution of these applications 150, 152 to display and distribute digital advertisements within the system 100. Further, the bidder server device 140 is a computerized device having a controller 142, such as a memory and a processor, and is configured to transact advertisement bidding on behalf of the advertiser server device 102 and the publisher server device 130. Each of the advertiser server device 102, publisher server device 130, and bidder server device 140 are disposed in electrical communication with each other, such as via a network which can be configured as either a wired or wireless wide-area network (WAN) or local-area network (LAN).

Figure 5:
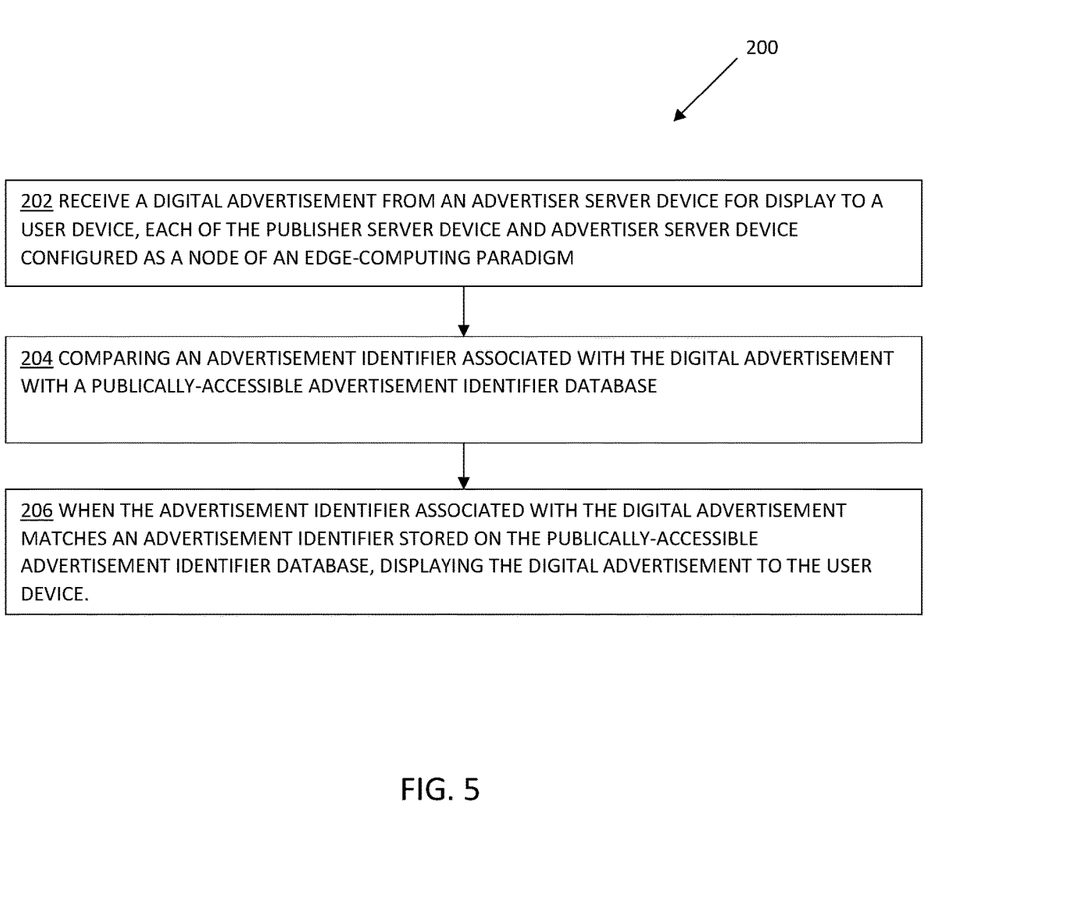
FIG. 5 is a flowchart which identifies the operation of a publisher server device during an advertisement serving process, according to one arrangement.

The digital advertisement distribution system 100 is configured to serve digital advertisement 106 to user devices 160 and to track user interaction with those digital advertisements 206 in a secure manner. FIG. 5 is a flowchart 200 which identifies the operation of a publisher server device 130 during such a serving process.

In element 202, the publisher server device 130 receives a digital advertisement 106 from an advertiser server device 102 for display to a user device 160, each of the publisher server device 130 and advertiser server device 102 configured as a node of an edge-computing paradigm.

For example, during the start of the process and with reference to FIG. 4, the publisher server device 130 can receive a URL request 162 for a particular website, such as via a network connection, from a user device 160, such as a mobile computerized device. While the website can include advertisements for display to the user device 160, these advertisements are served directly from advertiser server devices 102 of the digital advertisement distribution system 100. As such, prior to serving the website to the user device 160, the publisher server device 130 is configured to initiate an auction process by transmitting a digital advertisement availability notification 170 to a bidder server device 140, the digital advertisement availability notification 170 having associated publisher device target criteria 172. The digital advertisement availability notification 170 indicates to the bidder server device 140 that there is available digital advertisement space on a given website. Further, the publisher device target criteria 172 identifies criteria that a digital advertisement 106 should meet to be considered for publication as part of the website. For example, the publisher device target criteria 172 can include geographic location criteria, user device identification criteria (e.g., type of user device utilized, manufacturer, model, etc.) associated with the request 162, contextual targeting criteria (e.g., dates and times, languages, browsers and operating systems of the user device 160), and/or real-world data and event criteria 175.

In response to receiving the digital advertisement availability notification 170, the bidder server device 140 is configured to transmit a digital advertisement publishing slot availability notification 180 to one or more advertising server devices 102 included as part of the digital advertisement distribution system 100. Such transmission identifies the presence of an auction being held by the publisher server device 130. In one arrangement, the digital advertisement publishing slot availability notification 180 includes the publisher device target criteria 172 received from the publisher server device 130 (e.g., geolocations, device makes and models, dates and times, languages, browsers and operating systems of the user device 160, and/or real-world data 175).

In response to receiving the digital advertisement publishing slot availability notification 180, each advertising server device 102 can be configured to transmit a digital advertisement 106 to the bidder server device 140. As provided above, the digital advertisement 106 can include an image or video file 108 (e.g., an ad creative configured as a JPG, PNG, or other conventionally-supported image format) and a unique advertisement identifier 114. The digital advertisement 106 can also include advertiser device target criteria 174 and a landing page uniform resource locator (URL) 176. The advertiser device target criteria 174 can include geolocations, device makes and models, dates and times, languages, browsers and operating systems of the user device 160, and/or real-world data 179, for example. The landing page URL 176 can include text strings or IP addresses, for example.

The bidder server device 140 can be configured utilize the advertisement identifiers 114 to optimize the auction process associated with the publisher server device. For example, in conventional systems that do not utilize advertisement identifiers 114, digital advertisements can end up running against themselves in auctions in a process known as "double bidding" or "double spending" in the digital advertisement industry. In one arrangement, the bidder server device 140 is configured to identify and track the advertisement identifiers 114 for each digital advertisement 106 received. Because each digital advertisement 106 includes its own unique advertisement identifier 114, the bidder server device 140 can identify the presence of duplicate digital advertisements 106 after identifying multiple instances of the same advertisement identifier 114 for a particular auction. As such, the bidder server device 140 can eliminate duplicate digital advertisements 106 or bids from a particular advertiser server device 102 for the same auction, thereby mitigating the ability for an advertiser to bid against itself during an auction.

In one arrangement, the advertising server device 102 can provide the landing page URL 176 as an encrypted landing page URL 177 as part of the digital advertisement 106. For example, the advertising server device 102 can use the advertiser device target criteria 174 to encrypt the landing page URL 176. Encryption of the landing page URL 176 provides the advertising server device 102 with the ability to track valid, and monetized, user interactions with the digital advertisement 106 displayed by the publisher server device 130, as will be described in detail below.

Following receipt of the digital advertisements 106 from the advertising server devices 102, the bidder server device 140 is configured to transmit the digital advertisements 106 to the publisher server device 103. In one arrangement, once the bidder server device 140 and/or the advertiser server device 102 has received the digital advertisement availability notification 170 or digital advertisement publishing slot availability notification 180, respectively, the bidder server device 140 and/or the advertiser server device 102 is configured to compare the advertiser device target criteria 174 of each digital advertisement 106 with the publisher device target criteria 172. For example, the bidder server device 140 and/or the advertiser server device 102 can compare the geolocations, device makes and models, dates and times, languages, browsers and operating systems of the user device 160, and/or real-world data 179 identified in the advertiser device target criteria 174 with corresponding geolocations, device makes and models, dates and times, languages, browsers and operating systems of the user device 160, and/or real-world data 175 identified in the publisher device target criteria 172. In the case where the advertiser server device 102 determines that one or more of the elements of the publisher device target criteria 172 do not match or correspond with the advertiser device target criteria 174, the advertiser server device 102 can refrain from forwarding or paying for the digital advertisement 106. However, in the case where the advertiser server device 102 determines that the elements of the publisher device target criteria 172 match or correspond with the advertiser device target criteria 174, the bidder server device 140 can forward the digital advertisement 106 to the publisher server device 130.

Returning to FIG. 5, in element 204, the publisher server device 130 compares an advertisement identifier 114 associated with the digital advertisement 106 with a publicly-accessible advertisement identifier database 120. In element 206, when the advertisement identifier 114 associated with the digital advertisement 106 matches an advertisement identifier 190 stored on the publicly-accessible advertisement identifier database 120, the publisher server device 130 displays the digital advertisement 106 to the user device 160.

For example, as provided above, the identification server device 101 is configured to generate a unique advertisement identifier 114 for each digital advertisement 106 it receives and to store that advertisement identifier 114 as part of the advertisement identifier database 120. Over time, certain digital advertisements 106 can be deemed as inappropriate within the digital advertisement distribution system 100, such as digital advertisements 106 that include offensive content. With the identification of inappropriate digital advertisements 106 within the digital advertisement distribution system 100, the advertisement identifier database 120 can be updated to identify advertisement identifiers 190 associated with inappropriate digital advertisements 106 as being blacklisted or banned from distribution within the system 100.

The blacklisted identifier can be communicated to the devices on the digital advertisement distribution system 100 such that an ecosystem-wide ban on the inappropriate advertisement identifiers 190. Alternately, banned advertisement identifiers 190 can be identified within the advertisement identifier database 120 as being inappropriate and the associated digital advertisement as being banned from further distribution.

For example, the bidder server device 140, as the receiving entity of the target criteria 174 from the advertiser server device 102, can be configured to run pre-checks on them and on the submitted image files 108 or ad creatives. This process can be automated by pushing asynchronous requests to first or third-party visual recognition APIs that return text strings describing the contents of the image files 108. Thus, the bidder server device 140 can run checks on the scripts and can monitor for words, combinations of words, or phrases that are deemed to be unacceptable to the system 100. This method provides that digital advertisements 106 can be served in a substantially immediate timeframe after uploading, but can also be screened for content and in case of breaches. For example, the bidder server device 140 can enforce blacklists in real-time by uploading the offending digital advertisement's unique advertisement identifier 114 onto the database 120.

As such, in the case where the publisher server device 130 compares an advertisement identifier 114 associated with the digital advertisement 106 with advertisement identifiers 190 stored on the advertisement identifier database 120, the publisher server device 130 can match the advertisement identifier 114 with an allowable (e.g., non-banned) advertisement identifier 190 stored on the publicly-accessible advertisement identifier database 120. In the case where the publisher server device 130 identifies a correspondence between the advertisement identifier 114 associated with the digital advertisement 106 with advertisement identifiers 190 stored on the advertisement identifier database 120, the publisher server device 130 can serve the associated digital advertisement 106 to the user device 160 as part of the requested website.

Following display of the website and digital advertisement 106 to the user device 160, an end user can interact with the digital advertisement 106 via a web browser in order to obtain additional information related to the product or service being advertised. For example, the user can use a mouse device to click on the digital advertisement 106 in order to execute the associated landing URL 176 and gain access to an advertisement website provided by the advertiser server device 102.

As provided above, the advertising server device 102 can provide the landing page URL 176 as an encrypted landing page URL 177 as part of the digital advertisement 106. For example, with reference to FIG. 6, in response to receiving the digital advertisement publishing slot availability notification 180 from the bidder server device 140, the advertising server device 102 can provide a digital advertisement 106 to the publisher server device 140 which includes the encrypted landing page URL 177. Assume the case where the publisher server device 130 forwards the digital advertisement 106 to the user device 160 for display, such as part of a web browser or graphical user interface. In response to an end user activating or clicking on the digital advertisement 106 to execute the associated landing URL 177, the user device 160 can transmit first-party criteria 164 (e.g., geolocations, device makes and models, dates and times, languages, browsers and operating systems of the user device 160, and/or real-world data) to the bidder server device 140 which, in turn, transmits the first-party criteria 164 to the publisher server device 102.

Figure 6:
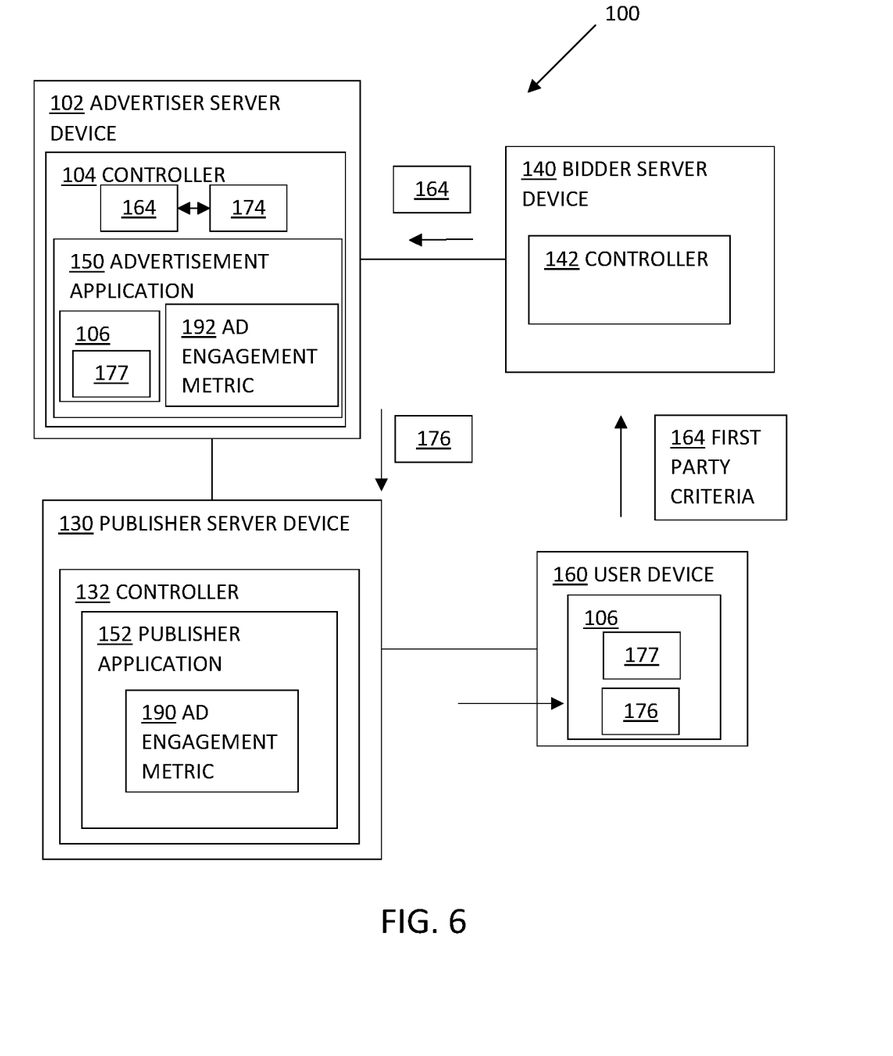
FIG. 6 illustrates a schematic representation of the digital advertisement distribution system of FIG. 3 having an encrypted landing page uniform resource locator (URL), according to one arrangement.

In response to receiving the first-party criteria 164, the publisher server device 102 compares the first-party criteria 164 to the advertiser device target criteria 174. In the case where the publisher server device 102 identifies a discrepancy or mismatch between the first-party criteria 164 and the advertiser device target criteria 174, the encrypted landing page URL 177 remains encrypted and, therefore, un-accessible or un-clickable. As such, the publisher server device 102 limits or prevents the user device 160 from accessing the landing page or website associated with the digital advertisement 106. Further, attempted activation of the encrypted landing page URL 177 would not count as an advertisement click and the advertiser should not be charged. However, in the case where the publisher server device 102 identifies a match between the first-party criteria 164 and the advertiser device target criteria 174 and the first-party criteria 164 is validated by the publisher server device 102, the publisher server device 102 can decrypt the encrypted landing page URL 177 and forward the decrypted landing page URL 176 to the publisher server device 130 for provision to the user device 160. As such, the advertising server device 102 and publisher server device 130 can track actual clicks for each digital advertisement 106 served by the publisher server device 130. For example, user engagement with the landing page URL 176 associated with the digital advertisement 106 displayed to the user device 160 can be stored as an advertisement engagement metric 190, 192 by the publisher server device 130 and the advertiser server device 102, respectively.

With such a configuration, the digital advertisement distribution system 100 provides a trustless environment in which advertisers have the final say in verifying that each individual transaction matches their targeting criteria 174. As such, advertisers are not required to rely upon, or trust, a publisher or advertising intermediary with respect to the number of actual impressions that a digital advertisement 106 receives.

Further, the configuration of the digital advertisement distribution system 100 allows advertising server devices 102 to serve digital advertisements 106 directly to end users while enabling publisher server device 130 to continue to monetize publishers' work by providing content for free while preserving the users' privacy and advertisement choices. For example, the digital advertisement distribution system 100 can mitigate the effect of advertisement blocking applications.

Figure 7:
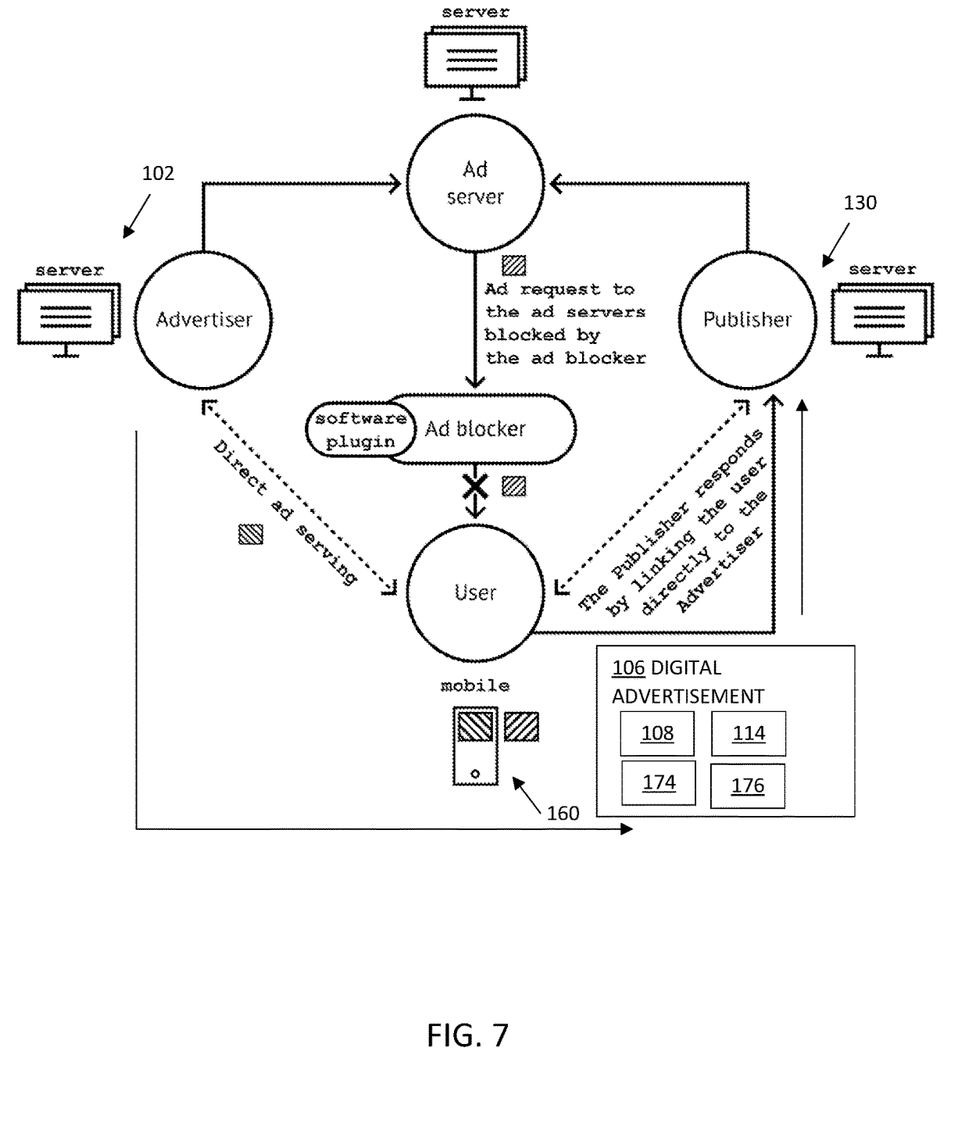
FIG. 7 illustrates the use of an advertisement blocking application, in a conventional advertisement distribution system and in the digital advertisement distribution system of FIG. 3.

FIG. 7 illustrates the use of an advertisement blocking application, both in a conventional advertisement distribution system and in the digital advertisement distribution system 100 described above. In a conventional advertisement distribution system, as identified by solid operation lines, an advertisement blocking application 250 can interrupt a connection between a user device 160 and an advertisement server. By contrast, with the digital advertisement distribution system 100, the advertiser server devices 102 serve content directly to user devices 160. As such, during operation, the user device 160 is not required to call the advertiser server devices 102 in order to access an advertisement web site. Instead, the user device 160 communication with the advertiser server device 102 is inaccessible by the advertisement blocking application 250.

Accordingly, by removing conventional third-party advertisement servers (i.e., middlemen) from the digital advertisement distribution system 100, advertisers can reach their audience directly and publishers can monetize their content. Additionally, with the use of advertisement identifier 114 within the system 100, end users can maintain their privacy and retain control over the digital advertisements they see.

As provided above, with reference to FIG. 4, in response to receiving a digital advertisement publishing slot availability notification 180 from a bidder server device 140, an advertising server device 102 is configured to transmit a digital advertisement 106 as a response back to the bidder server device 140. As provided above, the digital advertisement 106 can include an image or video file 108, a unique advertisement identifier 114, advertiser device target criteria 174, and a landing page uniform resource locator (URL) 176. In one arrangement, as indicated in FIG. 7, to further mitigate the effects of conventional advertisement blocking applications 250, the bidding process can be provided to the publisher server device 130, from the advertising server device 102 rather than from the bidder server device 140. For example, in response to receiving a digital advertisement publishing slot availability notification 180 from a bidder server device 140, the advertising server device 102 is configured to transmit, as a bid, a digital advertisement 106 to the publisher server device 130. While the digital advertisement 106 can be configured in a variety of ways, in one arrangement, the advertising server device 102 can encrypt the digital advertisement 106 to provide a level of security to the communication.

As provided above, user engagement with a digital advertisement 106 (e.g. activation of a landing page URL 176 associated with the digital advertisement 106) displayed to a user device 160 can be stored as an advertisement engagement metric 190, 192 by the publisher server device 130 and the advertiser server device 102, respectively. These advertisement engagement metrics 190, 192 can be utilized to validate user transactions and to confirm correct payment for user interactions with the digital advertisements 106.

Figure 8:
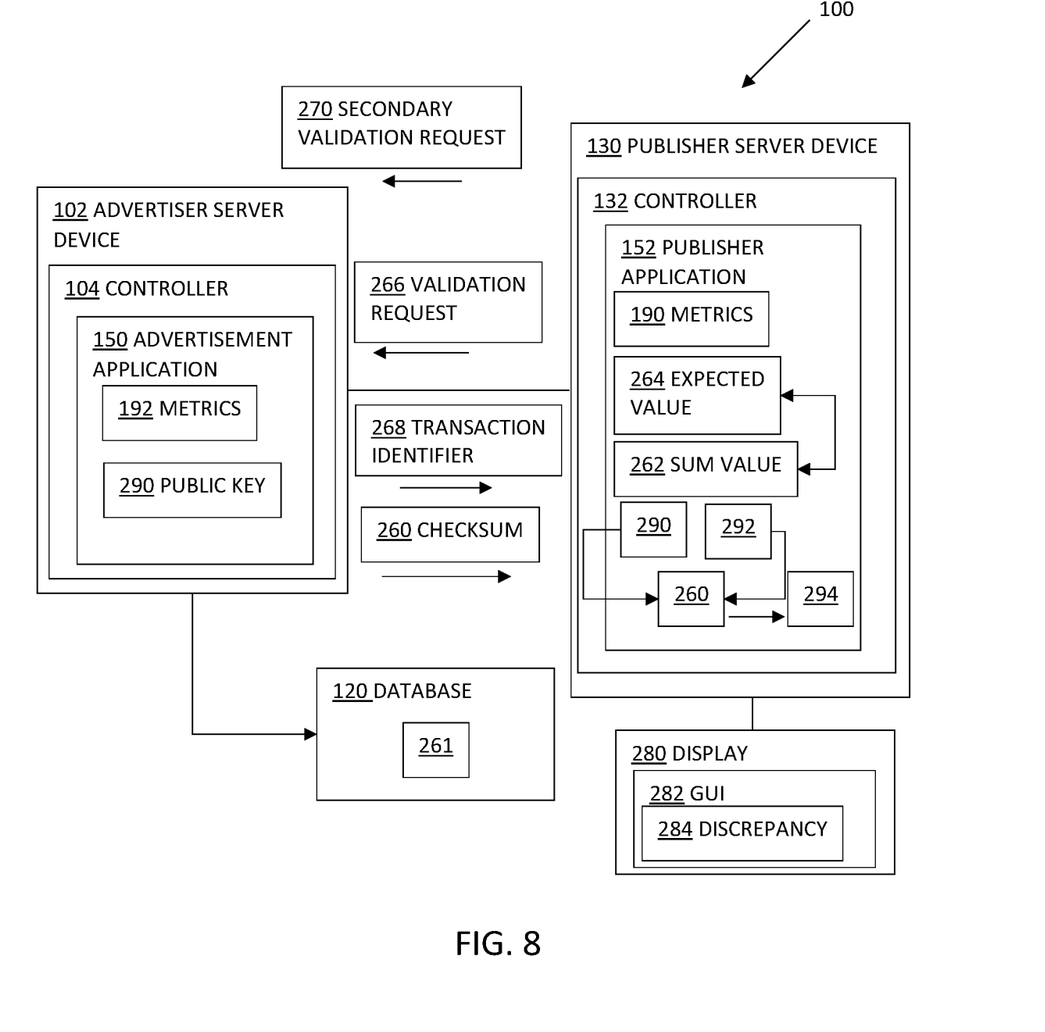
FIG. 8 illustrates a schematic representation of the digital advertisement distribution system of FIG. 3, according to one arrangement.

In one arrangement, with reference to FIG. 8, during operation each of the publisher server device 130 and advertiser server device 102 can store advertisement engagement metrics 190, 192 associated with user interaction or engagement with a digital advertisement 106. For example, in response to an end user activating (e.g., clicking on) a landing page URL 176, the each of the publisher server device 130 and advertiser server device 102 can store data related to the activation, such as the time-to-click, unique visitors, frequency and recency capping, click coordinates, and click timestamps as advertisement engagement metrics 190, 192, respectively, while providing user device 160 privacy.

After a given period of time, such as the expiration of an advertising campaign engaged by an advertiser, the advertiser can issue a payment to the publisher. With such payment, the advertiser server device 102 transmits a checksum 260 to the publisher server device 130 for all transactions recorded over a given time period, such as based upon the advertisement engagement metrics 192 stored by the advertiser server device 102. Further, the advertiser server device 102 is configured to record the checksum 261 with the publicly-accessible database 120 to secure the validation process.

In response to the publisher receiving payment, the publisher server device 130 is configured to perform a payment reconciliation. For example, with continued reference to FIG. 8, during a payment reconciliation process, the publisher server device 130 compares a sum value of all expected transactions 262 for a given time period, such as identified by the advertisement engagement metrics 190, to an expected transaction value 264, such as the amount received from all advertiser server devices 102. In the event the publisher server device 130 identifies a discrepancy between the sum value of all expected transactions 262 and the expected transaction value 264, the publisher server device 130 is configured to issue validation requests 266 to all advertiser server devices 102 with which the publisher server device 130 has transacted business. Further, in one arrangement, the publisher server device 130 is configured to display the identified discrepancies 284, as well as the identified advertiser server devices 102, as part of a graphical user interface 282 on a display 280.

For example, the publisher server device 130 can provide historical data about the identified discrepancies (e.g., for a 100 day timer period or other time period), as well as display the discrepancies 284 as part of a graphical user interface 282 or chart where all three stakeholders' measurements are represented—those of the publisher server device 130, the bidder server device 140, and the advertiser server device 102. Thus, consistent discrepancies by any one of the servers 102, 130, 140 in any given direction can be traced visually and addressed.

In response to the validation request 266, each advertiser server device 102 can transmit an advertiser transaction identifier 268 to the publisher server device 130 which can be based upon the advertisement engagement metrics 192 and can identify a complete list of the transactions and payments made with all publisher server devices 130 in the system 200 in the given period of time. In order to provide a level of security to the advertiser transaction identifier 268, each advertiser server device 102 can encrypt each advertiser transaction identifier 268 with a public key 290 of the publisher server device 130 to preserve data privacy and security.

When the publisher server device 130 receives the advertiser transaction identifiers 268, the publisher server device 130 is configured to utilize its private key 292 in combination with the public key 290 to decrypt its own records from the advertiser transaction identifier 268. The publisher server device 130 is configured to then review the information of the decrypted advertiser transaction identifier 268 to identify all of the sums paid by all corresponding advertisers and to identify the advertisers that did not pay as much as expected 294. Further, the publisher server device 130 can compare the checksum 260 received from each advertiser server device 102 with the checksum 261 stored on the publicly-accessible database 120 to validate the truthfulness of the payment sum reported by each advertiser server device 102. Following the review, the publisher server device 130 is configured to initiate a secondary validation request 270 to those advertiser server devices 102 where the corresponding advertisers paid less than expected.

During the validation process, the bidder server device 140 can be configured to take an observing role between the advertiser server device 102 and the publisher server device 130. Accordingly, when resolving discrepancies between the two transacting parties (advertiser server device 102 and the publisher server device 130), the bidder server device 140 acts as a silent observer where its measurements are non-enforceable. The bidder server device 140 acts to merely serve as a reference point and can be enforced in the scenario of a dispute where a public vote by the wider system 100 elects to side with either the advertiser's or the publisher's data.

Accordingly, use of the advertisement engagement metrics 190, 192 as part of an edge-computing paradigm provides publisher server devices 130 and advertiser server devices 102 with the ability to compare records relating to user interactions with a digital advertisement 106 to directly to their own records. This enables direct verification for digital advertisements 106 which is not provided in conventional centralized architectures.

Further, the use of the advertisement engagement metrics 190, 192 enables advertiser server devices 102 to bridge a conventional gap found between the advertisement engagement metrics 192 obtained regarding the audiences which have interacted with their digital advertisements 106 and the audiences of their own web sites or applications. Typically, an advertiser would receive one set of data for the former and then have tools or employees trying to match it to the latter. Those attempts can result in significant discrepancies, as matching the two disparate datasets can be technically challenging even when fraud is not present. Use of the advertisement engagement metrics 192 can bridging the gap between the two, essentially merging the two datasets, to mitigate the need to have two different databases and to find liaisons between them. Thus, the datasets from an advertisement campaigns can match the datasets from the analytics data generated by applications or website visitors, and can match the server logs from the web servers.

In one arrangement, information exchanged among the publisher server device 130, bidder server device 140, and advertiser server device can be performed in a variety of ways in order to mitigate as many of the discrepancies between advertiser and publisher data as possible. Depending on the needs, after the publisher server device 130 serves a digital advertisement 106, there can be a different order of providing notification to the three parties (i.e., publisher (P), bidder (B), and advertiser (A)). The notification order can take one of six forms: P-B-A; P-A-B; B-A-P; B-P-A; A-B-P; and A-P-B. Different orders may be used in different scenarios in order to best mitigate data discrepancies.

As provided above, in one arrangement, both the publisher device target criteria 172 and the advertiser device target criteria 174 can include real-world data 175, 179, respectively. The real-world data 175, 179 can be used to increase or decrease the value of a bid that an advertiser is willing to pay for their advertising campaign according to how those real-world events can affect the purchasing decisions of the users. The real-world data 174, 179 include any events happening in the real-world surrounding the user that might influence his or her purchasing decisions. For example, the real-world data 174, 179 can include weather data, sports data, stock-market data, currency data, news data, search trend data voting results, and other data. The real-world data 174, 179 can be collected either from first-party or third-party sources and can be recorded for future reference, analytics, and validation.

While various embodiments of the innovation have been particularly shown and described, it will be understood by those skilled in the art that various changes in form and details may be made therein without departing from the spirit and scope of the innovation as defined by the appended claims.

What is claimed is:

1. A method for serving a digital advertisement, comprising:

transmitting, by an advertiser server device, an image file of the digital advertisement to an identification server device through a network;

receiving, by the advertiser server device, an advertisement identifier associated with the digital advertisement from the identification server device, the advertisement identifier stored as part of an immutable ledger, the advertisement identifier being unique to the image file of the digital advertisement and the advertisement identifier attributing the image file to a specific advertiser as associated with the advertiser server device;

transmitting, by the advertiser server device, the digital advertisement including the image file and the advertisement identifier directly to a user device through a publisher server device, each of the advertiser server device and the publisher server device configured as a node of an edge-computing paradigm, the advertiser server device configured to:

track advertisement engagement metrics related to an advertising activity associated with the digital advertisement, and store the advertisement engagement metrics related to the advertising activity associated with the digital advertisement;

receiving, by the advertiser server device, a validation request from the publisher server device without assistance from a third-party advertisement server, the validation request relating to the advertisement engagement metrics of the advertising activity associated with the digital advertisement as stored by the publisher server device and based upon a discrepancy, detected by the publisher server device, in a payment reconciliation with the advertiser server device; and in response to receiving the validation request:

transmitting, by the advertiser server device, an advertiser transaction identifier to the publisher server device, without assistance from a third-party advertisement server, based upon the advertisement engagement metrics stored by the advertiser server device, the advertiser transaction identifier identifying transactions and payments made with the publisher server device.

2. The method of claim 1, wherein transmitting the digital advertisement directly to the user device through the publisher server device comprises:
receiving a digital advertisement publishing slot availability notification from a bidder server device, the digital advertisement publishing slot availability notification having associated publisher device target criteria; and
transmitting the digital advertisement to the bidder server device based upon the digital advertisement publishing slot availability notification received from the bidder server device, the digital advertisement further comprising advertiser device target criteria and a landing page uniform resource locator (URL).

3. The method of claim 2, wherein:
the publisher device target criteria comprises real-world data; and
the advertiser device target criteria comprises real-world data;
the real-world data selected from the group consisting of weather data, sports data, stock-market data, currency data, news data, and search trends data.

4. The method of claim 2, wherein transmitting the digital advertisement to the bidder server device based upon the digital advertisement publishing slot availability notification received from the bidder server device, comprises:
transmitting the digital advertisement to the bidder server device based upon the digital advertisement publishing slot availability notification received from the bidder server device, the digital advertisement further comprising advertiser device target criteria and a landing page URL, the landing page URL encrypted with the advertiser target criteria.

5. The method of claim 1, wherein transmitting the digital advertisement directly to the user device through the publisher server device comprises:
receiving a digital advertisement availability notification from a bidder server device, the digital advertisement availability notification having associated publisher device target criteria; and
transmitting the digital advertisement directly to the user device through the publisher server device based upon the digital advertisement publishing slot availability notification received from the bidder server device, the digital advertisement having advertiser device target criteria and a landing page uniform resource locator (URL).

6. The method of claim 5, wherein:
the publisher device target criteria comprises real-world data; and
the advertiser device target criteria comprises real-world data;
the real-world data selected from the group consisting of weather data, sports data, stock-market data, currency data, news data, and search trends data.

7. The method of claim 5, wherein transmitting the digital advertisement directly to the user device through the publisher server device based upon the digital advertisement publishing slot availability notification received from the bidder server device, comprises:
transmitting the digital advertisement directly to the user device through the publisher server device based upon the digital advertisement publishing slot availability notification received from the bidder server device, the digital advertisement further comprising advertiser device target criteria and a landing page URL, the landing page URL encrypted with the advertiser target criteria.

8. The method of claim 1, further comprising storing advertisement engagement metrics relating to user engagement with the digital advertisement displayed to the user device by the publisher server device.

9. An advertiser server device, comprising:
a controller having a processor and memory, the controller configured to:
transmit an image file of a digital advertisement to an identification server device through a network;
receive an advertisement identifier associated with the digital advertisement from the identification server device, the advertisement identifier stored as part of an immutable ledger, the advertisement identifier being unique to the image file of the digital advertisement and the advertisement identifier attributing the image file to a specific advertiser as associated with the advertiser server device;
transmit the digital advertisement including the image file and the advertisement identifier directly to a user device through a publisher server device, each of the advertiser server device and the publisher server device configured as a node of an edge-computing paradigm, the advertiser server device configured to:
track advertisement engagement metrics related to an advertising activity associated with the digital advertisement, and
store the advertisement engagement metrics related to the advertising activity associated with the digital advertisement;
receive a validation request from the publisher server device without assistance from a third-party advertisement server, the validation request relating to the advertisement engagement metrics of the advertising activity associated with the digital advertisement as stored by the publisher server device and based upon a discrepancy, detected by the publisher server device, in a payment reconciliation with the advertiser server device; and
in response to receiving the validation request, the controller is configured to:
transmit an advertiser transaction identifier to the publisher server device, without assistance from a third-party advertisement server, based upon the advertisement engagement metrics stored by the advertiser server device, the advertiser transaction identifier identifying transactions and payments made with the publisher server device.

10. The method of claim 1, wherein receiving the advertisement identifier associated with the digital advertisement from the identification server device comprises receiving a hashed textual file from the identification server device, the textual file converted from the image file of the digital advertisement transmitted to the identification server device and the advertisement identifier being unique to the image file of the digital advertisement.

11. The method of claim 10, wherein receiving the hashed textual file from the identification server device, the textual file converted from the image file of the digital advertisement transmitted to the identification server device comprises receiving the hashed textual file from the identification server device, the textual file converted via application of a binary-to-text encoding algorithm to the image file of the digital advertisement.

12. The advertiser server device of claim 9, wherein when transmitting the digital advertisement directly to the user device through the publisher server device the controller is configured to:
- receive a digital advertisement publishing slot availability notification from a bidder server device, the digital advertisement publishing slot availability notification having associated publisher device target criteria; and
- transmit the digital advertisement to the bidder server device based upon the digital advertisement publishing slot availability notification received from the bidder server device, the digital advertisement further comprising advertiser device target criteria and a landing page uniform resource locator (URL).

13. The advertiser server device of claim 12, wherein:
- the publisher device target criteria comprises real-world data; and
- the advertiser device target criteria comprises real-world data;
- the real-world data selected from the group consisting of weather data, sports data, stock-market data, currency data, news data, and search trends data.

14. The advertiser server device of claim 12, wherein when transmitting the digital advertisement to the bidder server device based upon the digital advertisement publishing slot availability notification received from the bidder server device, the controller is configured to:
- transmit the digital advertisement to the bidder server device based upon the digital advertisement publishing slot availability notification received from the bidder server device, the digital advertisement further comprising advertiser device target criteria and a landing page URL, the landing page URL encrypted with the advertiser target criteria.

15. The advertiser server device of claim 9, wherein when transmitting the digital advertisement directly to the user device through the publisher server device the controller is configured to:
- receive a digital advertisement availability notification from a bidder server device, the digital advertisement availability notification having associated publisher device target criteria; and
- transmit the digital advertisement directly to the user device through the publisher server device based upon the digital advertisement publishing slot availability notification received from the bidder server device, the digital advertisement having advertiser device target criteria and a landing page uniform resource locator (URL).

16. The advertiser server device of claim 15, wherein:
- the publisher device target criteria comprises real-world data; and
- the advertiser device target criteria comprises real-world data;
- the real-world data selected from the group consisting of weather data, sports data, stock-market data, currency data, news data, and search trends data.

17. The advertiser server device of claim 15, wherein when transmitting the digital advertisement directly to the user device through the publisher server device based upon the digital advertisement publishing slot availability notification received from the bidder server device, the controller is configured to:
- transmit the digital advertisement directly to the user device through the publisher server device based upon the digital advertisement publishing slot availability notification received from the bidder server device, the digital advertisement further comprising advertiser device target criteria and a landing page URL, the landing page URL encrypted with the advertiser target criteria.

18. The advertiser server device of claim 9, wherein the controller is further configured to store advertisement engagement metrics relating to user engagement with the digital advertisement displayed to the user device by the publisher server device.

19. The advertiser server device of claim 9, wherein when receiving the advertisement identifier associated with the digital advertisement from the identification server device the controller is configured to:
- receive a hashed textual file from the identification server device, the textual file converted from the image file of the digital advertisement transmitted to the identification server device and the advertisement identifier being unique to the image file of the digital advertisement.

20. The advertiser server device of claim 19, wherein when receiving the hashed textual file from the identification server device, the textual file converted from the image file of the digital advertisement transmitted to the identification server device the controller is configured to:
- receive the hashed textual file from the identification server device, the textual file converted via application of a binary-to-text encoding algorithm to the image file of the digital advertisement.

\* \* \* \* \*